United States Patent
Cohen et al.

(10) Patent No.: US 12,454,264 B2
(45) Date of Patent: Oct. 28, 2025

(54) POLYNOMIAL PREDICTION OF ROAD LANE METADATA

(71) Applicant: AUTOBRAINS TECHNOLOGIES LTD, Tel Aviv-Jaffa (IL)

(72) Inventors: Jonathan Cohen, Tel Aviv (IL); Tom Tabak, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 43 days.

(21) Appl. No.: 18/461,480

(22) Filed: Sep. 5, 2023

(65) Prior Publication Data

US 2024/0075925 A1 Mar. 7, 2024

Related U.S. Application Data

(60) Provisional application No. 63/374,373, filed on Sep. 2, 2022.

(51) Int. Cl.
| | | |
|---|---|---|
| *B60W 30/12* | (2020.01) | |
| *B60W 10/20* | (2006.01) | |
| *B60W 40/072* | (2012.01) | |
| *B60W 60/00* | (2020.01) | |
| *G06V 10/82* | (2022.01) | |
| *G06V 20/56* | (2022.01) | |

(52) U.S. Cl.
CPC ............ *B60W 30/12* (2013.01); *B60W 10/20* (2013.01); *B60W 40/072* (2013.01); *B60W 60/001* (2020.02); *G06V 10/82* (2022.01); *G06V 20/588* (2022.01); *B60W 2420/403* (2013.01); *B60W 2552/30* (2020.02); *B60W 2552/53* (2020.02); *G06V 2201/10* (2022.01)

(58) Field of Classification Search
CPC .... B60W 30/12; B60W 10/20; B60W 40/072; B60W 60/001; B60W 2420/403; B60W 2552/30; B60W 2552/53; B60W 2552/10; G06V 10/82; G06V 20/588; G06V 2201/10
USPC .......................................................... 701/41
See application file for complete search history.

(56) References Cited

U.S. PATENT DOCUMENTS

| | | | | |
|---|---|---|---|---|
| 2019/0251373 | A1* | 8/2019 | Lee | G01C 21/3658 |
| 2019/0259157 | A1* | 8/2019 | Madabhushi | G06F 18/2451 |
| 2020/0074189 | A1* | 3/2020 | Xie | G06V 20/588 |
| 2020/0242353 | A1* | 7/2020 | Zhang | G06V 10/82 |

* cited by examiner

*Primary Examiner* — Yi-Kai Wang
(74) *Attorney, Agent, or Firm* — RECHES PATENTS

(57) ABSTRACT

A method for steering assistance, the method may include obtaining by vehicle camera, an image of an environment of the vehicle; feeding the image to a machine learning process; outputting, by the machine learning process, road line metadata that comprises a line offset value, a line angle value, a line curvature value and a line curvature rate; and preforming a steering related response to the road line metadata.

21 Claims, 7 Drawing Sheets

51

52

53

54

POLYNOMIAL PREDICTION OF ROAD LANE METADATA

BACKGROUND

Autonomous driving and various advanced driver assistance system (ADAS) functionalities require to detect road lanes located within an environment of a vehicle.

Current lade detection methods include multiple separate steps that may be erroneous—and the error from one step is added to errors of other steps. The steps include detecting road lane pixels within an image, clustering the road lane pixels, transforming lane lines constructed from the clustered road lane pixels to birds eye view points of reference (which required a highly accurate calibration—mapping between the two types of information) and, detection lanes based on current and previous images. These steps are also inefficient as the calculate multiple variables (such as x and y coordinates) that are not done by a human driver (while driving).

There is a growing need to provide a more accurate method for road lane detection.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
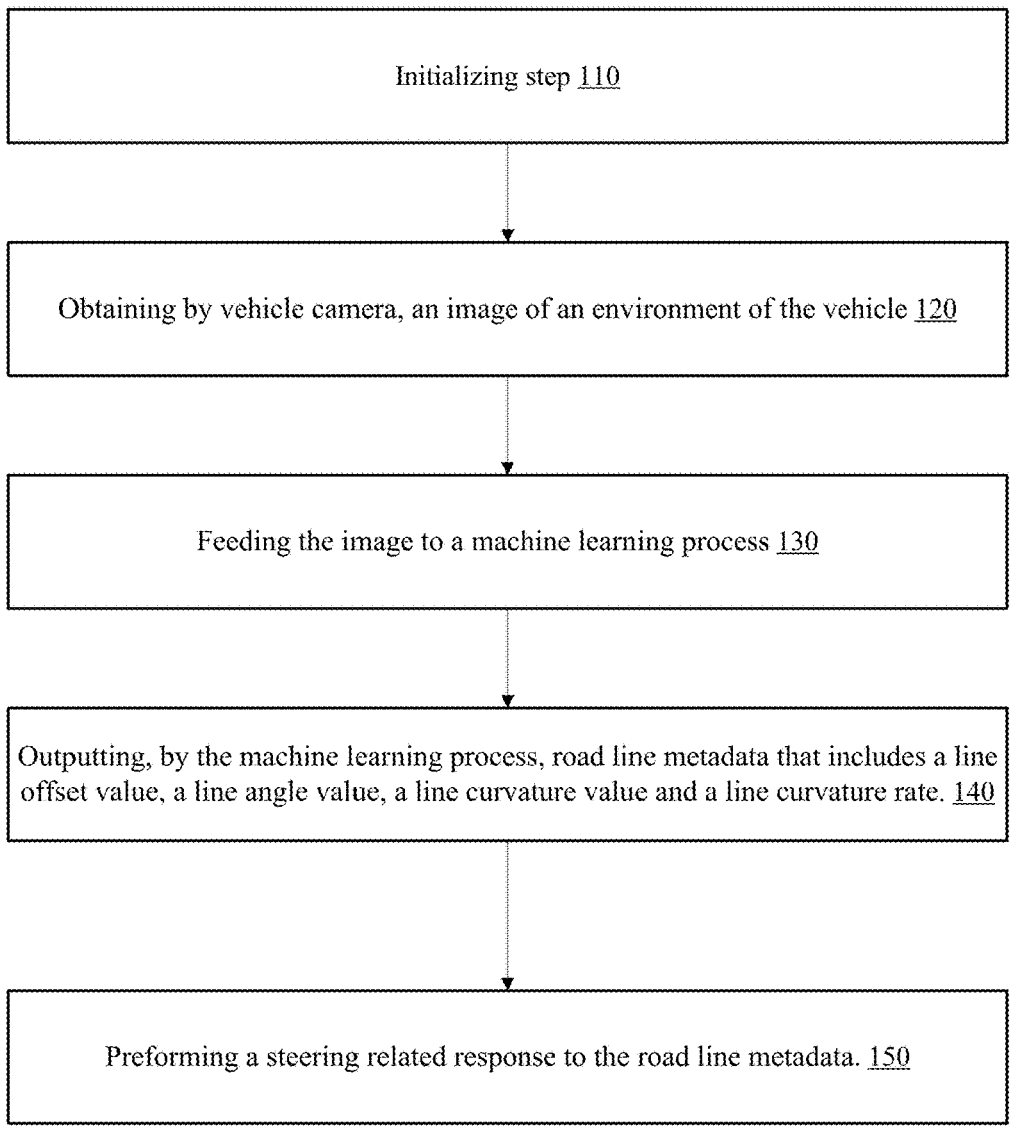
FIG. 1 illustrates an example of a road lane metadata.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The vehicle may be any type of vehicle that a ground transportation vehicle, an airborne vehicle, and a water vessel.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

It has been found that the following road lane metadata may be directly calculated by a machine learning process—which provides a more accurate solution in relation to multiple step solutions.

The method may calculate the road lane metadata in real time—for example tens of times (and even more) a second—for example one per each acquired image (acquired at rates that may exceed 10, 20, 30, 40, 50, 60, 70, 80, 90, 100 and more images per second), even when the image includes hundred of thousand and even millions of pixels—which is required for impacting driving decisions.

Figure 3:
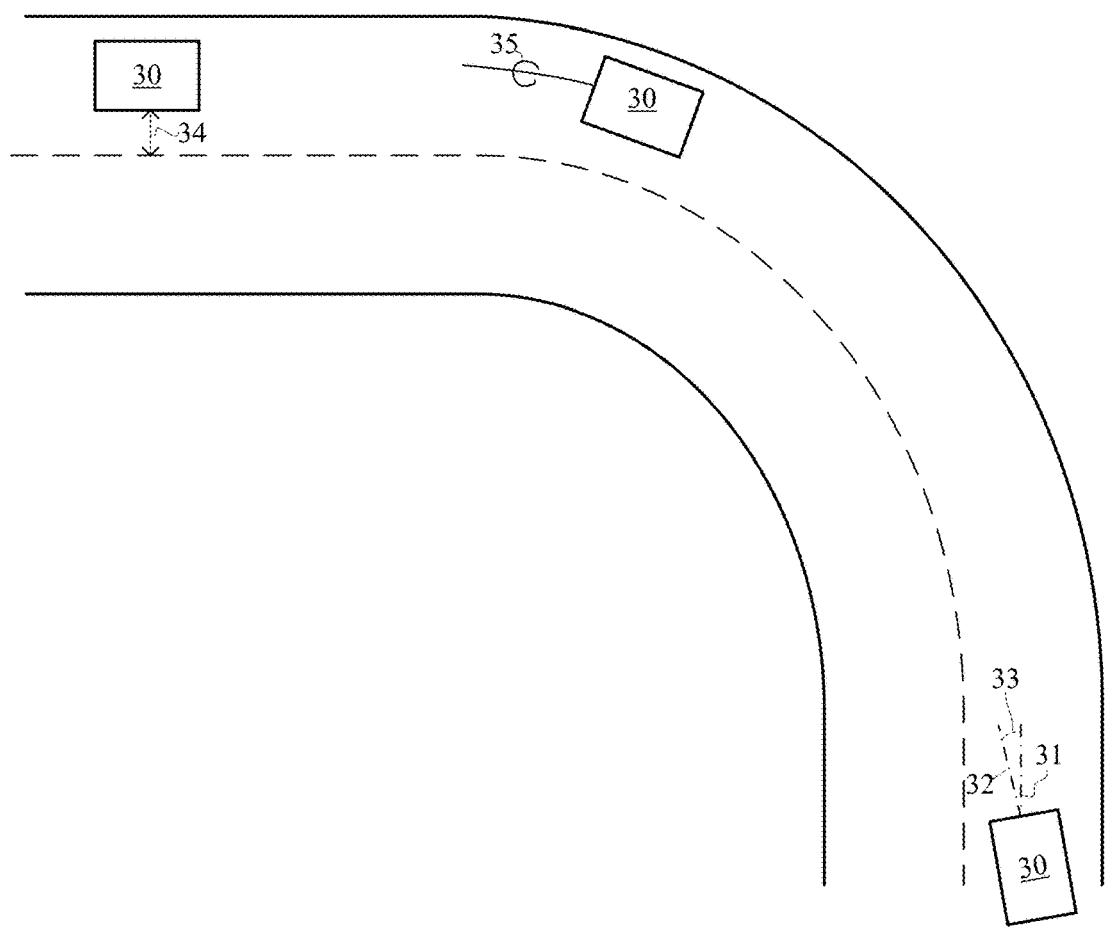
FIG. 3 illustrates examples of images of curved road lane segments.

The road lane metadata may include a line offset value, a line angle value, a line curvature value and a line curvature rate. Examples of some of the road lane metadata elements are provided in FIG. 3—(a) line offset value 34, (b) line angle value 33 is the angle between the angle of the road line 31 and the vehicle progress direction 32, and (c) line curvature value 35.

The line offset value is indicative of a lateral distance between the vehicle and a road line.

The line angle value is indicative of an angle of the road line in relation to vehicle progress direction.

The line curvature value is indicative of an amount of steering required for maintaining the vehicle within a road line that is curved.

The line curvature rate value is indicative of a rate of steering change required to maintain the vehicle within a curved lane segment, when the vehicle enters or exits a curved lane segment that is delimited by one or more road lines.

It has been found that calculating said road lane metadata and making steering related response to the road line metadata provides a highly efficient solution that is also accurate and consumes significantly less (at least 10%, 20% or more less) computational and memory resources than prior art solutions—and provides an improvement in computer science.

FIG. 1 illustrates an example of method 100 for steering assistance.

Method 100 may start by initializing step 110. Initializing step 110 may include training a machine learning process, receiving a trained machine learning process, and the like.

The initializing step 110 may be executed one per multiple repetitions of steps 120, 130, 140 and 150.

Step 110 may be followed by step 120 of obtaining by vehicle camera, an image of an environment of the vehicle. Multiple images may acquired per second. The images may be obtained from one or more vehicle cameras.

Step 120 may be followed by step 130 of feeding the image to a machine learning process.

Step 130 may be followed by step 140 of outputting, by the machine learning process, road line metadata that includes a line offset value, a line angle value, a line curvature value and a line curvature rate.

The machine learning process directly maps the image to the road lane metadata. The term "directly" may mean that the machine learning process receives the image and provide the roan lane metadata without performing separate steps of using finding pixels, clustering pixels, converting the road lanes to birds eye view points of reference.

The machine learning process may be implemented by a neural network—such as but not limited to an end to end neural network.

Step 140 may be followed by step 150 of preforming a steering related response to the road line metadata.

The steering related response may include maintaining the current steering state of the vehicle, changing the steering (by applying autonomous driving and/or ADAS driving), suggesting and/or instructing a human driver to maintain the steering, or suggesting and/or instructing a human driver to maintain the steering. The ADAS driving may include lane maintaining, emergency breaking, and the like.

The road line metadata may be related to one or more road lanes, to multiple road lanes, to at least two lanes of the multiple lanes, and the like.

The road line metadata may be related to all road lanes captures in an image or only to some of the road lanes captured in the image.

Limiting the road line metadata to only some of the lanes captured by the image may reduced the computational resources and/or memory resources required to execute method 100, and may increase the accuracy of the lane detection.

The road lane metadata may be of any format—for example it may include content related only to the road lanes detected in an image. For example—when only two road lanes are detected—the road lane metadata may consist essentially only the two road lanes metadata.

Yet for another example—the road lane metadata may be formatted to include a predefined number of instances of road lane metadata—regarding a predefined number (for example –4, 5, 6, and more) instances—whereas road lane metadata instances regarding road lanes not captured in an image will be flagged or otherwise denoted as being irrelevant.

For example, assuming that there are six instances of road lane metadata, a matrix Y that includes the six instances—one per row of the matrix below:

$$Y = \begin{matrix} e1 & a1 & b1 & c1 & d1 \\ e2 & a2 & b2 & c2 & d2 \\ e3 & a3 & b3 & c3 & d3 \\ e4 & a4 & b4 & c4 & d4 \\ e5 & a5 & b5 & c5 & d5 \\ e6 & a6 & b6 & c6 & d6 \end{matrix}$$

Whereas:
  Variable e1 till e6 are lane existence indicators indicative whether their column (row lane metadata regarding a road lane) is relevant or not—whether it exists in an image or not.
  Variables a1 till a6 are line offset values, variable b1 till b6 are line angle values, variables c1 till c6 are line curvature values, and values d1 till d6 are line curvature rates.

Figure 4:
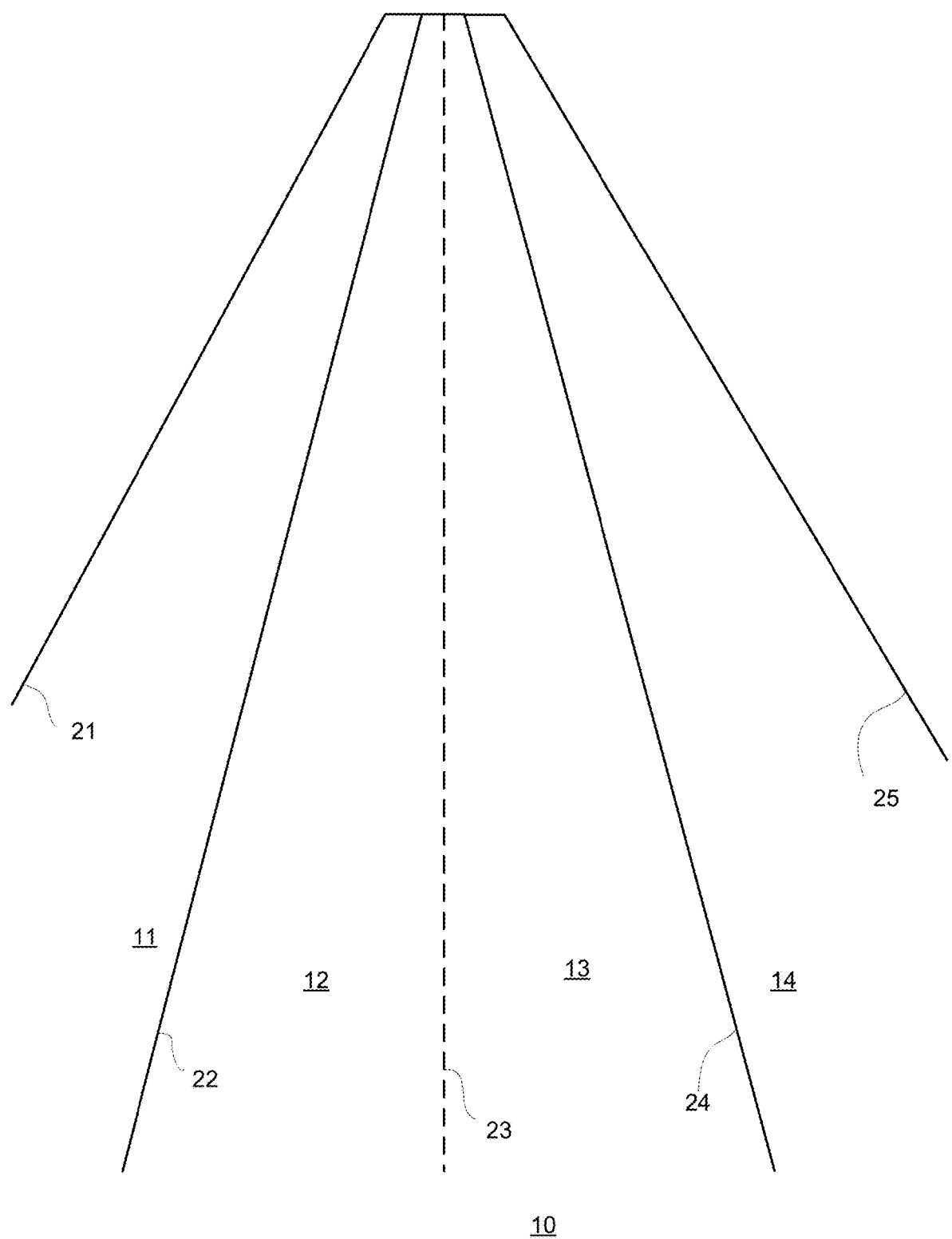
FIG. 4 illustrates examples of images of multiple straight road lane segments.
Figure 5:
FIG. 5 illustrates an example of an image of two curved road lane segments.
Figure 5:
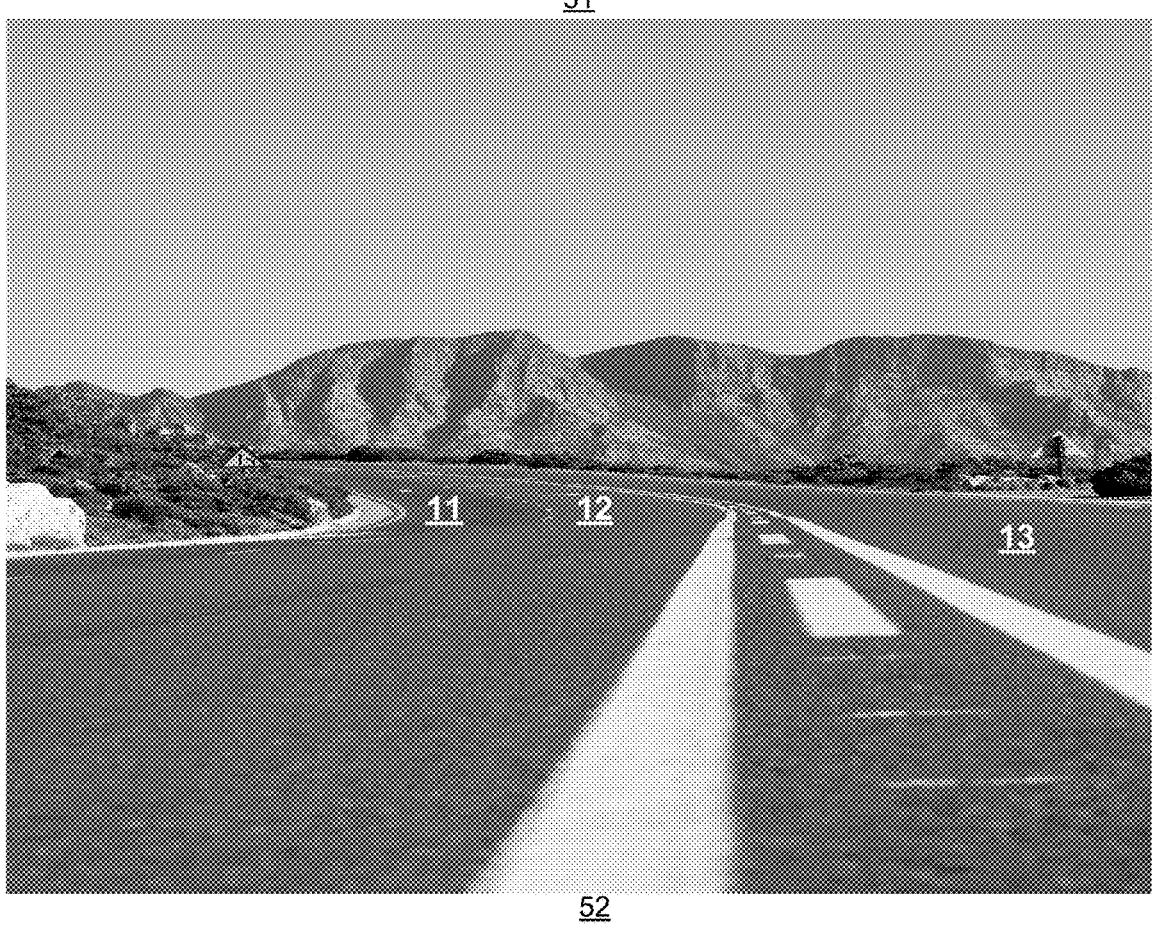
Figure 6:
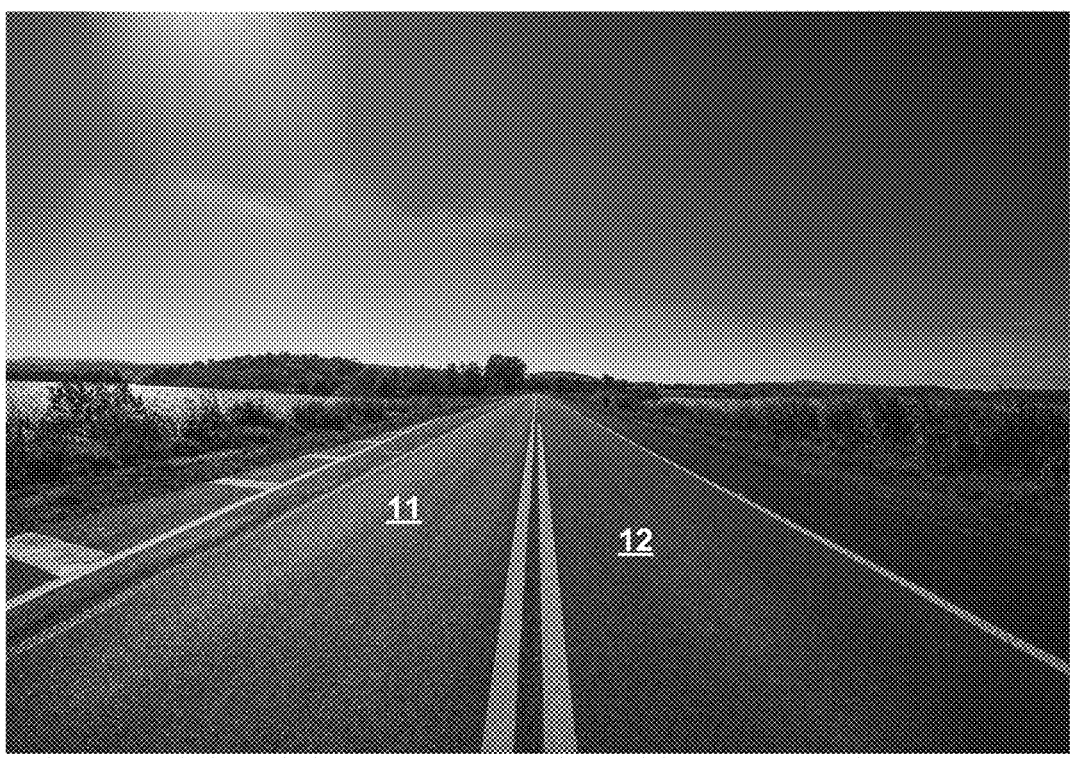
FIG. 6 illustrates an example of a method.
Figure 6:
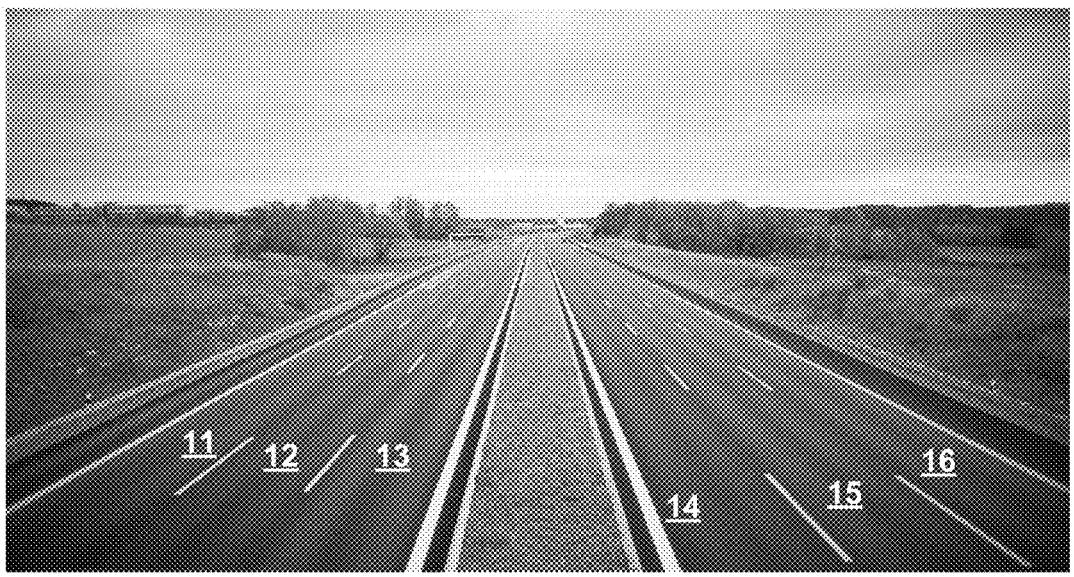
Figure 7:
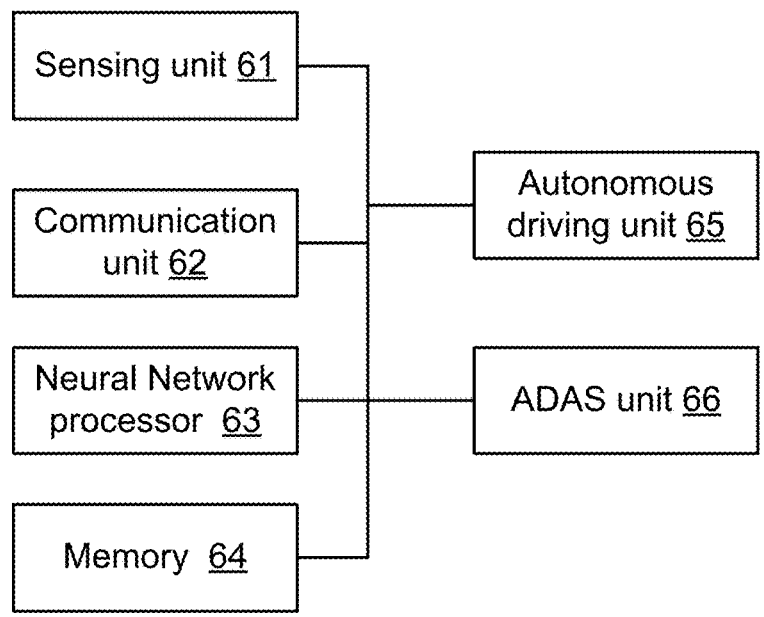
FIG. 7 illustrates an example of a system.

Examples of values of various variables of the road lane metadata are provided below. It is assumed that a zero-valued lane existence indicator means that there is no road lane:
  FIG. 4 illustrates an example of image 10 of four straight road lane segments 11, 12, 13 and 14 (road lane boundaries 21, 22, 23, 24 and 25). In this case e5 and e6 are zero. There is no curve so that variables c1 till c6 and d1 till d6 may be zero.
  FIG. 5 illustrates an example of image 51 of two curved road lane segments 11 and 12. In this case e3, e4, e5 and e6 are zero. Due to the curves—variables c1, c2, d1 and d2 may be non-zero.
  FIG. 6 also illustrates an example of image 52 of three curved road lane segments 11, 12 and 13. In this case e4, e5 and e6 are zero. Due to the curves—variables c1, c2, c3, d1, d2 and d3 may be non-zero.
  FIG. 7 illustrates an example of image 53 of two straight road lane segments 11 and 12. In this case e3, e4, e5 and e6 are zero. There is no curve so that variables c1 till c6 and d1 till d6 may be zero.
  FIG. 7 also illustrates an example of image 54 of six straight road lane segments 11, 12, 13, 14, 15 and 16 and 12. In this case e1, e2, e3, e4, e5 and e6 are nonzero. There is no curve so that variables c1 till c6 and d1 till d6 may be zero.

Step 140 may include preforming of the steering related response while ignoring road lane steering related metadata associated with an irrelevant lane.

Figure 2:
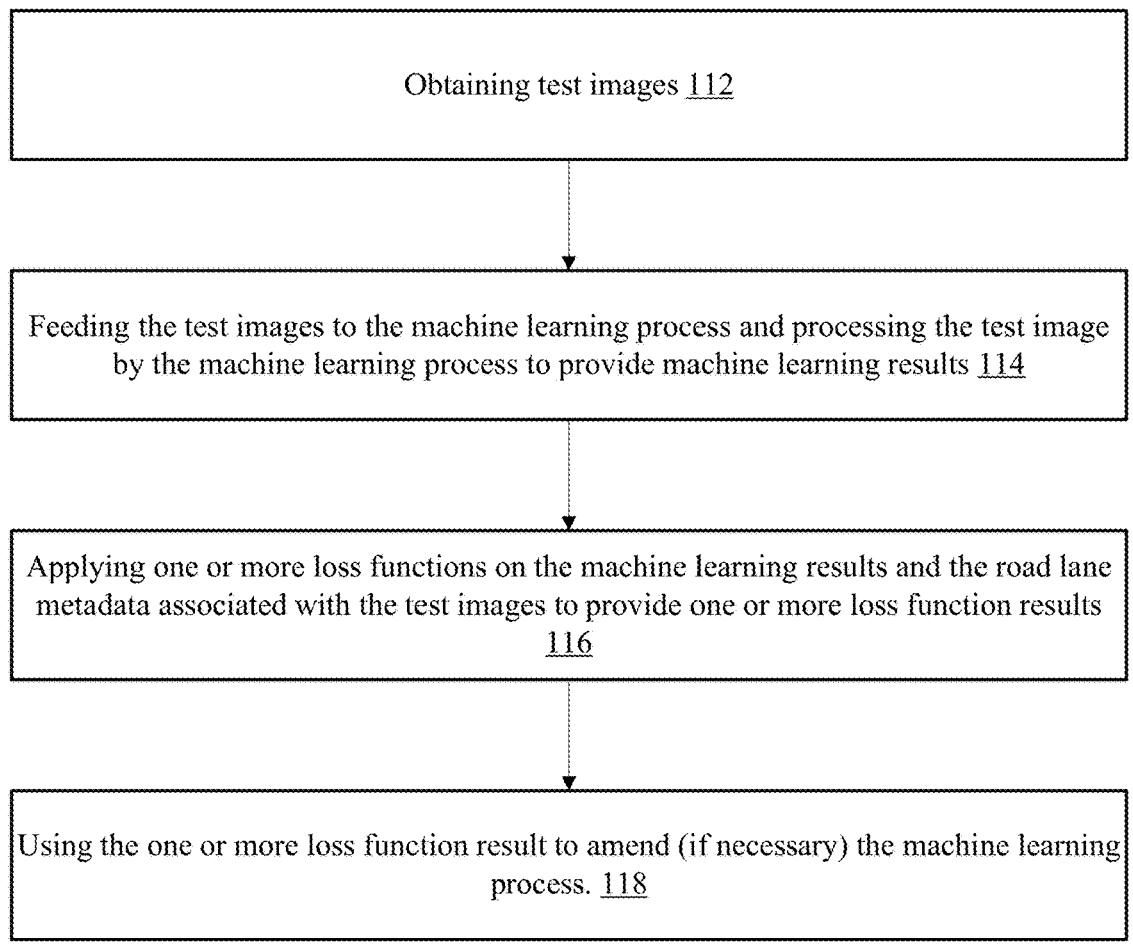
FIG. 2 illustrates an example of an image of multiple straight road lane segments.

FIG. 2 illustrates an example of method 110 of training a machine learning process.

The training may be a supervised training process.

Method 110 may start by step 112 of obtaining test images. The test images may be associated with road lane metadata per each road lane captured in the test imager—or for only some of the road lanes—for example only for a fixed number of road lanes.

Step 112 may be followed by step 114 of feeding the test images to the machine learning process to provide machine learning results.

Step 114 may be followed by step 116 of applying a loss function on the machine learning results and the road lane metadata associated with the test images to provide a loss function result.

Step 116 may be followed by step 118 of using the loss function result to amend (if necessary) the machine learning process.

The at least some of the test images capture different number of lanes.

Step 116 may include at least one out of:

Applying different loss functions on one or more different elements of the road lane metadata.

Applying the same loss function on two or more different elements of the road lane metadata.

Applying a first loss function for generating the lane existence indicator.

Applying another loss function for generating the road lane steering related metadata.

Applying a cross entropy loss function for generating the lane existence indicator.

Applying a mean square error loss function for generating the road lane steering related metadata.

Benefits of using more than a single loss functions. Cross-entropy is needed to determine if a certain lane-line (ego left, ego right, adjacent left . . . ) exists. Loss on the meta-data (offset, heading, . . . ) is needed to determine the location and shape of the lane (if the lane exists).

Examples of Systems

FIG. 7 illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

System 4900 may include sensing unit 4902, communication unit 4904, input 4911, one or more processors—such as processor 4950, and output 4919. The communication unit 4904 may include the input and/or the output. The communication unit 4904 may communicate with any entity—within the vehicle (for example driver device, passenger device, multimedia device), outside the vehicle (another vehicle, another computerized system—such as out-of-vehicle computerized system 4820 of FIG. 1N, another road user, another human outside the vehicle), and the like.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of (and thus may not include at least one out of):

Multiple spanning elements 4951(q).

Multiple merge elements 4952(r).

Object detector 4953.

Cluster manager 4954.

Controller 4955.

Selection unit 4956.

Object detection determination unit 4957.

Signature generator 4958.

Movement information unit 4959.

Identifier unit 4915 configured to identify objects (anchors and non-anchor objects).

While system 4900 includes a sensing unit 4902—is should be noted that it may receive sensed information from other sensors and/or that the sensing unit does not belong to the system. The system may receive information from one or more sensors located in the vehicle, associated with the vehicle, and/or located outside the vehicle.

There is provided a method that is computer-implemented and is for steering assistance, the method includes (a) processing, at a machine learning process an image obtained by a camera of a vehicle of an environment of the vehicle; and (b) creating, by the machine learning process, road line metadata that comprises a line offset value, a line angle value, a line curvature value and a line curvature rate; the road line metadata facilitates a steering related response. The line offset value is indicative of a lateral distance between the vehicle and a road line. The line angle value is indicative of an angle of the road line in relation to vehicle progress direction. The line curvature value is indicative of an amount of steering required for maintaining the vehicle within a road line that is curved. The line curvature rate value is indicative of a rate of steering change required to maintain the vehicle within a curved lane segment, when the vehicle enters or exits a curved lane segment that is delimited by one or more road lines.

A non-transitory computer readable medium including instructions that, when executed by at least one processor, cause the at least one processor to perform operations for steering assistance, including (a) processing, at a machine learning process an image obtained by a camera of a vehicle of an environment of the vehicle; and (b) creating, by the machine learning process, road line metadata that comprises a line offset value, a line angle value, a line curvature value and a line curvature rate; the road line metadata facilitates a steering related response. The line offset value is indicative of a lateral distance between the vehicle and a road line. The line angle value is indicative of an angle of the road line in relation to vehicle progress direction. The line curvature value is indicative of an amount of steering required for maintaining the vehicle within a road line that is curved. The line curvature rate value is indicative of a rate of steering change required to maintain the vehicle within a curved lane segment, when the vehicle enters or exits a curved lane segment that is delimited by one or more road lines.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method that is computer-implemented and is for steering assistance, the method comprises:
    processing, at a machine learning process an image obtained by a camera of a vehicle of an environment of the vehicle; and
    directly mapping in a single step and in real time, by the machine learning process, road line metadata that comprises a line offset value, a line angle value, a line curvature value and a line curvature rate; the road line metadata facilitates a steering related response;
    wherein the line offset value is indicative of a lateral distance between the vehicle and a road line;
    wherein the line angle value is indicative of an angle of the road line in relation to vehicle progress direction;
    wherein the line curvature value is indicative of an amount of steering required for maintaining the vehicle within a road line that is curved; and
    wherein the line curvature rate value is indicative of a rate of steering change required to maintain the vehicle within a curved lane segment, when the vehicle enters or exits a curved lane segment that is delimited by one or more road lines.

2. The method according to claim 1 wherein the machine learning process is implemented by a neural network.

3. The method according to claim 1 wherein the machine learning process is implemented by an end to end neural network.

4. The method according to claim 1 wherein an accuracy of the road line metadata generated by the directly mapping is higher than an accuracy of road line metadata calculated by a multiple step process.

5. The method according to claim 1 wherein the directly mapping is executed without performing separate steps that comprise finding pixels and additional steps.

6. The method according to claim 1 wherein the directly mapping is executed without performing separate steps that comprise converting the road lanes to birds eye view points of reference.

7. The method according to claim 1 wherein the road line metadata is related to multiple lanes.

8. The method according to claim 1 wherein the road line metadata comprises, per each lane, a lane existence indicator that indicates whether road line metadata related to the lane is relevant.

9. The method according to claim 8 further comprising ignoring road lane steering related metadata associated with an irrelevant lane.

10. The method according to claim 1 wherein the machine learning process was trained with test images.

11. The method according to claim 10 wherein the test images were tagged with road line metadata for the fixed number of lanes.

12. The method according to claim 10 wherein at least some of the test images capture different number of lanes.

13. The method according to claim 10 wherein the machine learning process was trained by applying a first loss function for generating the lane existence indicator and by applying another loss function for generating the road lane steering related metadata.

14. The method according to claim 10 wherein the machine learning process was trained by applying a cross entropy loss function for generating the lane existence indicator.

15. The method according to claim 10 wherein the machine learning process was trained by applying a mean square error loss function for generating the road lane steering related metadata.

16. The method according to claim 1 wherein the preforming a steering related response comprises autonomously driving the vehicle based on the machine learning process output.

17. A non-transitory computer readable medium including instructions that, when executed by at least one processor, cause the at least one processor to perform operations for steering assistance, comprising:
   processing, at a machine learning process an image obtained by a camera of a vehicle of an environment of the vehicle; and
   directly mapping in a single step and in real time, by the machine learning process, road line metadata that comprises a line offset value, a line angle value, a line curvature value and a line curvature rate; the road line metadata facilitates a steering related response;
   wherein the line offset value is indicative of a lateral distance between the vehicle and a road line;
   wherein the line angle value is indicative of an angle of the road line in relation to vehicle progress direction;
   wherein the line curvature value is indicative of an amount of steering required for maintaining the vehicle within a road line that is curved; and
   wherein the line curvature rate value is indicative of a rate of steering change required to maintain the vehicle within a curved lane segment, when the vehicle enters or exits a curved lane segment that is delimited by one or more road lines.

18. The non-transitory computer readable medium according to claim 17 wherein the road line metadata is related to multiple lanes.

19. The non-transitory computer readable medium according to claim 17 wherein the road line metadata comprises, per each lane, a lane existence indicator that indicates whether road line metadata related to the lane is relevant.

20. The method according to claim 1, wherein the road line metadata is a matrix of line offset values, line angle values, line curvature values and line curvature rate values for multiple road lanes.

21. The method according to claim 1, comprising limiting the road lane metadata to only a portion of lanes captured in the image.

\* \* \* \* \*